(12) United States Patent
Wyatt et al.

(10) Patent No.: US 7,364,243 B2
(45) Date of Patent: Apr. 29, 2008

(54) RACK FRAME STRUCTURE AND METHOD OF ASSEMBLING SAME

(76) Inventors: Brendan Wyatt, Room 2401, (23A01), No. 7 Bldg., No. 1188 Chang Ning Road, Chang Ning District, Shanghai 200042 (CN); Barry Kiernan, Room 1701, No. 5 Bldg., No. 28 Ziyun Lane (West), Chang Ning District, Shanghai 200051 (CN)

( * ) Notice: Subject to any disclaimer, the term of this patent is extended or adjusted under 35 U.S.C. 154(b) by 0 days.

(21) Appl. No.: 11/299,614

(22) Filed: Dec. 9, 2005

(65) Prior Publication Data

US 2006/0103274 A1    May 18, 2006

Related U.S. Application Data

(63) Continuation of application No. 10/400,113, filed on Mar. 26, 2003, now abandoned.

(60) Provisional application No. 60/368,390, filed on Mar. 28, 2002.

(51) Int. Cl.
*A47G 29/00* (2006.01)
*A47F 5/14* (2006.01)
*E04B 9/12* (2006.01)

(52) U.S. Cl. .................. 312/265.4; 211/182; 211/189; 403/219

(58) Field of Classification Search ............... 312/263, 312/265.5, 265.1, 265.2, 265.3, 265.4, 140; 211/26, 189, 182; 403/219
See application file for complete search history.

(56) References Cited

U.S. PATENT DOCUMENTS

| 2,485,172 | A | * | 10/1949 | Rau et al. | 403/219 |
| 3,195,196 | A | * | 7/1965 | Carisi | 403/219 |
| 3,353,854 | A | * | 11/1967 | Hansen | 403/171 |
| 3,370,871 | A | * | 2/1968 | Piarotto | 403/219 |
| 3,642,310 | A | * | 2/1972 | Hudson | 403/219 |
| 3,769,772 | A | * | 11/1973 | Oetiker | 52/646 |
| 4,347,015 | A | * | 8/1982 | Olashaw | 403/219 |
| 5,930,972 | A | * | 8/1999 | Benner et al. | 52/653.1 |
| 2003/0214205 | A1 | * | 11/2003 | Wyatt et al. | 312/265.4 |

FOREIGN PATENT DOCUMENTS

DE    20118376.5 U1    2/2002

* cited by examiner

*Primary Examiner*—Sarah B. McPartlin
(74) *Attorney, Agent, or Firm*—Gallop, Johnson & Neuman, L.C.

(57) ABSTRACT

A cabinet having a frame, a plurality of posts and a plurality of connector assemblies. The connector assemblies adapted to connect the posts to the frame. The connector assembly is provided with a gusset fixed to the frame, and a clamp plate connected to the gusset and received in the post so as to be engageable with a portion of the post. The clamp plate being movable with respect to the gusset such that upon movement of the clamp plate toward the gusset the clamp plate clamps the post between the clamp plate and at least one of the gusset and the frame, and a clamp plate.

8 Claims, 5 Drawing Sheets

RACK FRAME STRUCTURE AND METHOD OF ASSEMBLING SAME

CROSS-REFERENCE TO RELATED APPLICATIONS

This application is a continuation of U.S. Ser. No. 10/400,113, filed Mar. 26, 2003, which claims priority under 35 U.S.C. § 119 to the provisional application identified by application Ser. No. 60/368,390, filed on Mar. 28, 2002, the entire content of which is hereby incorporated herein by reference.

BACKGROUND OF THE INVENTION

The present invention is directed to the field of cabinets for holding electronic equipment. In particular, the present invention is directed to a cabinet frame having precision modular construction, and providing a rack for rack-mounted electronic equipment such as servers and telecommunications equipment.

The electronic cabinets are used to hold electronic equipment in a space-efficient configuration. The electronic equipment is configured with flanges for mounting to a rack inside the cabinet.

DETAILED DESCRIPTION OF THE INVENTION

Figure 1:
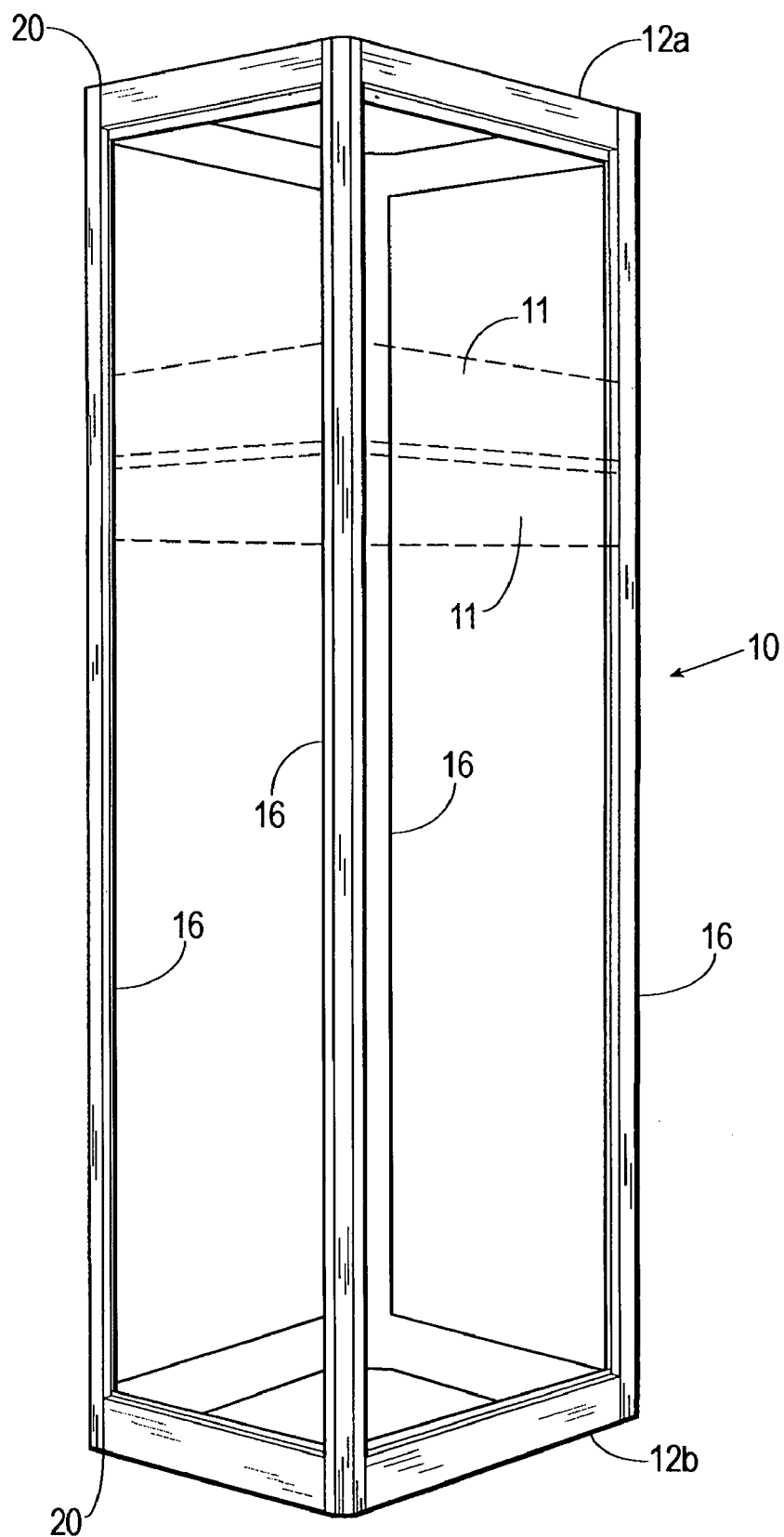
FIG. 1 is a perspective view of a cabinet constructed in accordance with the present invention.

Referring now to the drawings and, in particular to FIG. 1 shown therein, and designated by reference numeral 10 is a cabinet constructed in accordance with the present invention. As will be explained in more detail below, the cabinet 10 is provided with modular construction so that the cabinet 10 is typically configured for supporting electronic equipment 11, such as a server or telecom equipment. The cabinet 10 can be shipped when unassembled and then assembled on-site without any sacrifice of structural integrity or quality of the finally assembled cabinet 10. The cabinet 10 is typically supplied complete with front/rear doors, side panels, top and base plates, fan plate assembly, adjustable feet, grounding kit, depth members and adjustable mounting verticals. Other optional accessory parts, including plain/vented front panels, cable trays, chassis runners, sliding shelves, fixed shelves, front stabilizing foot, and castors.

The cabinet 10 is provided with two top/base frames 12. The top frame will be designated hereinafter as 12a, and the base frame will be designated hereinafter as 12b. In one preferred embodiment, the top frame 12a and the base frame 12b are identical in construction and function and thus, when referring in general to such construction, the top frame 12a or the base frame 12b will simply be referred to as the "frame 12".

Figure 2:
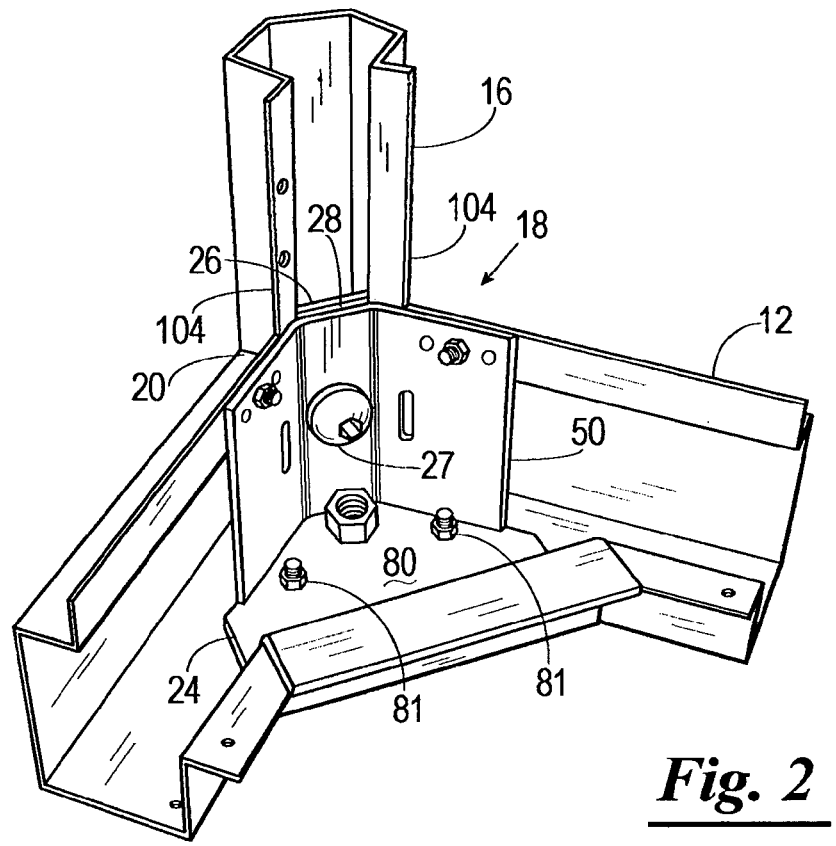
FIG. 2 is a fragmental, perspective view of a connector assembly, constructed in accordance with the present invention, connecting a post to a frame.

The cabinet 10 is also provided with one or more posts 16, and one or more connector assembly 18 (see FIG. 2). The connector assembly 18 connects the post 16 to the frame 12.

In one preferred embodiment, the cabinet 10 can be characterized as a rectangular cabinet constructed of the top frame 12a, the base frame 12b, four posts 16 and eight connector assemblies 18. In this embodiment, the top frame 12a and the base frame 12b substantially correspond in size and are both provided with a rectangular shape defining four corners 20 (only one of the corners 20 of the top frame and base frame 12a and 12b are designated herein for purposes of clarity. Each of the posts 16 is positioned adjacent to one of the corners 20 of the top frame 12a and the base frame 12b and extends between the top frame 12a and the base frame 12b. Two connector assemblies 18 are provided for connecting each of the posts 16 to the top frame 12a and the base frame 12b.

Figure 3:
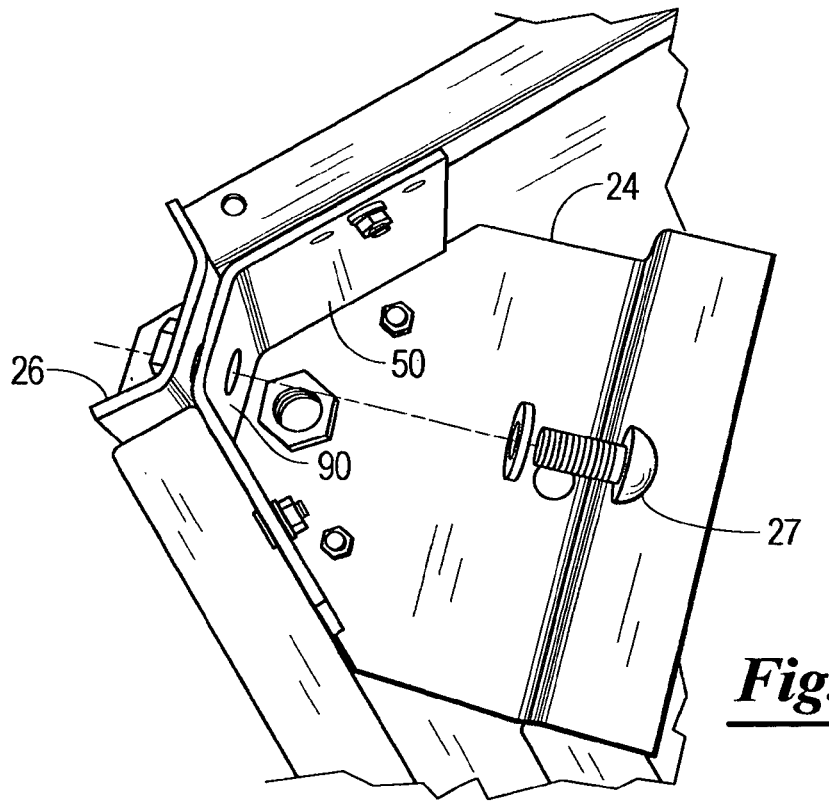
FIG. 3 is another perspective view of the connector assembly.

As best shown in FIGS. 2 and 3, the connector assembly 18 includes a corner gusset plate 24, and a corner clamp plate 26. When the cabinet is assembled, the corner gusset plate 24 is rigidly supported by the frame 12. The corner clamp plate 26 is supported by the corner gusset plate 24 and spaced a distance therefrom to form a channel 28 between at least a portion of the corner gusset plate 24 and the corner clamp plate 26. At least a portion of the post 16 is positioned within the channel 28 and clamped between the corner gusset plate 24 and the corner clamp plate 26. For example, the corner clamp plate 26 can be connected to the corner gusset plate 24 by a M12×25 button-head allen screw 27. However, it should be understood that the corner gusset plate 24 can be connected to the corner clamp plate 26 by any other suitable method or assembly, such as a wingnut screw, a carriage screw, a clamping device, keys, magnets, or any other type of mechanical or magnetic assembly capable of changing the relative width of the channel 28 to clamp the post 16 as described herein.

Figure 4:
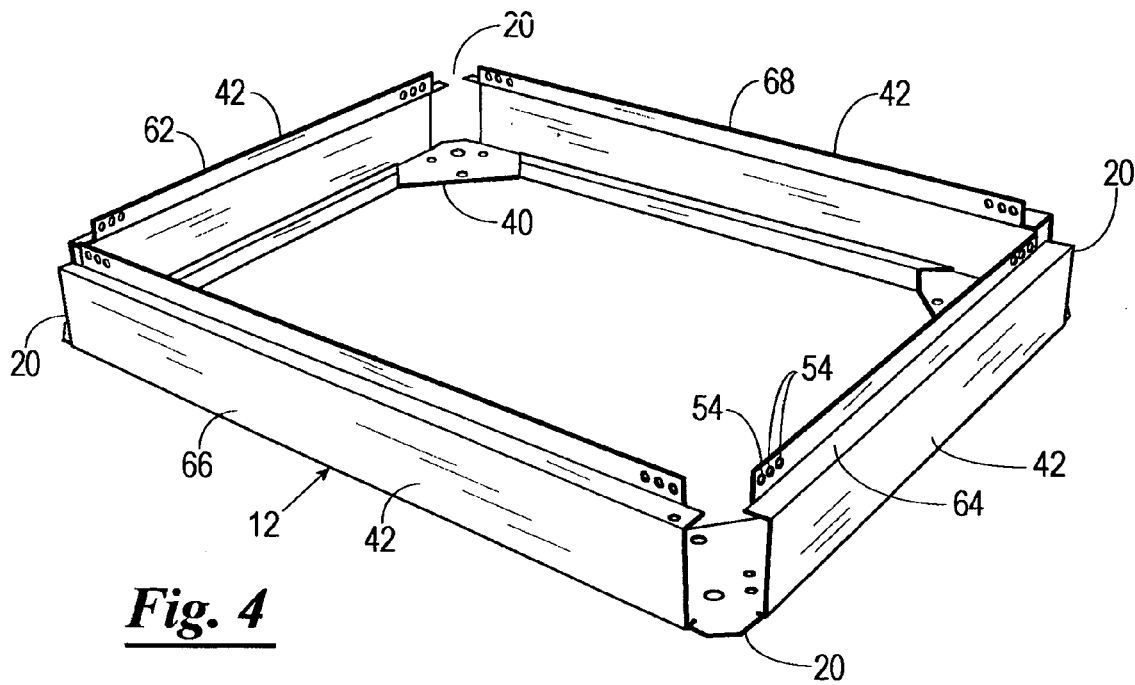
FIG. 4 is a perspective view of a frame constructed in accordance with the present invention.
Figure 5:
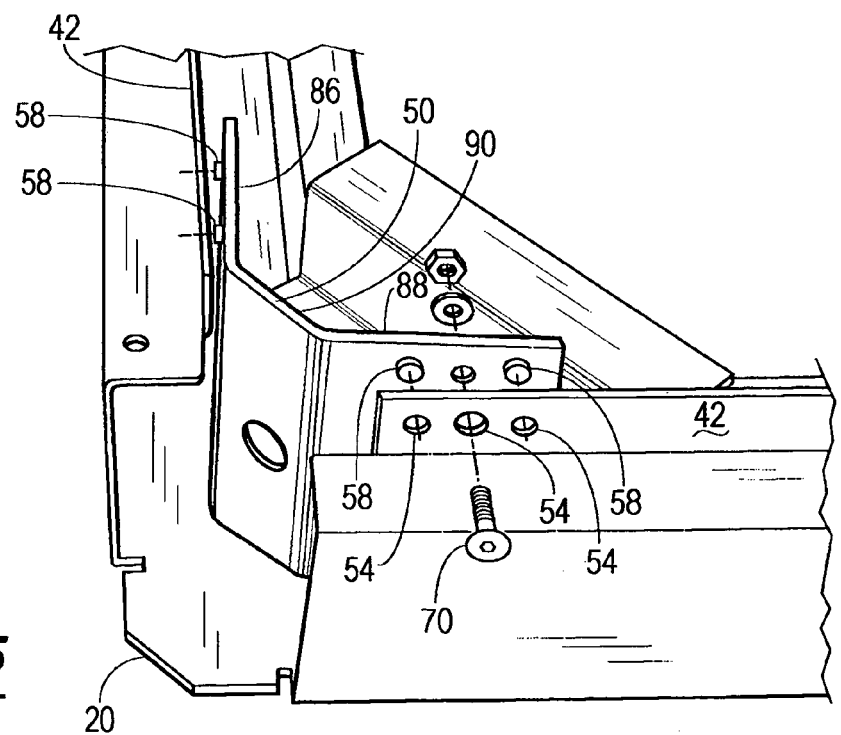
FIG. 5 is a perspective view showing a corner gusset plate being connected to the frame depicted in FIG. 4.
Figure 9:
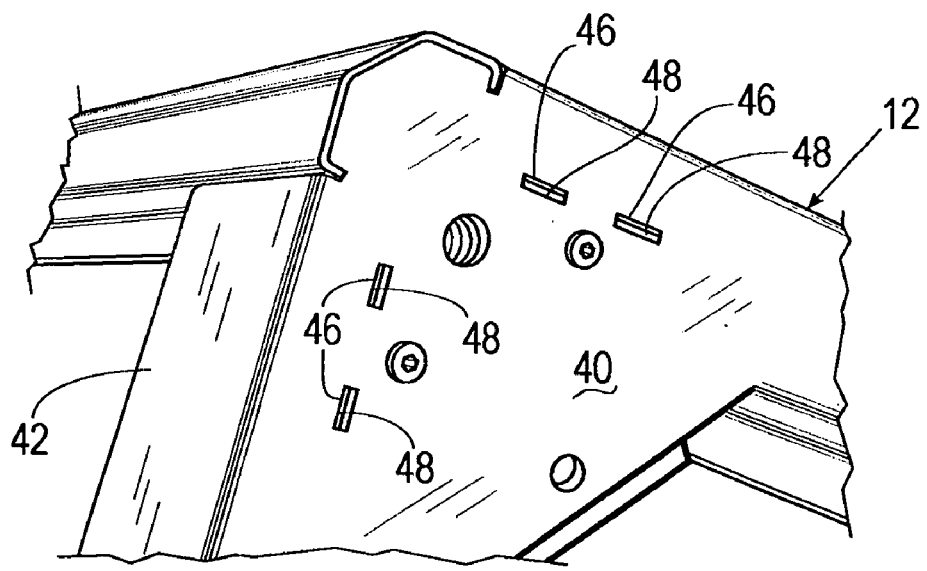

Referring now to FIG. 4, the frame 12 will now be described in more detail. The frame 12 includes a horizontal wall 40 and a vertical sidewall 42. One or more slots 46 (FIG. 9) are formed in the horizontal wall 40 of the frame 12. In the example shown in FIGS. 4 and 5, the frame 12 is provided with four corners 20, and four slots 46 are formed in the horizontal wall 40 adjacent each of the corners 20. Thus, the horizontal wall 40 of the frame 12 includes sixteen slots 46.

Each of the corner gusset plates 24 is provided with at least one tab 48 (FIG. 9) which is positioned within one of the slots 46. In the example shown in the drawings, each of the corner gusset plates 24 is provided with four tabs 48 which correspond to the four slots 46 provided in each of the corners 20.

Figure 6:
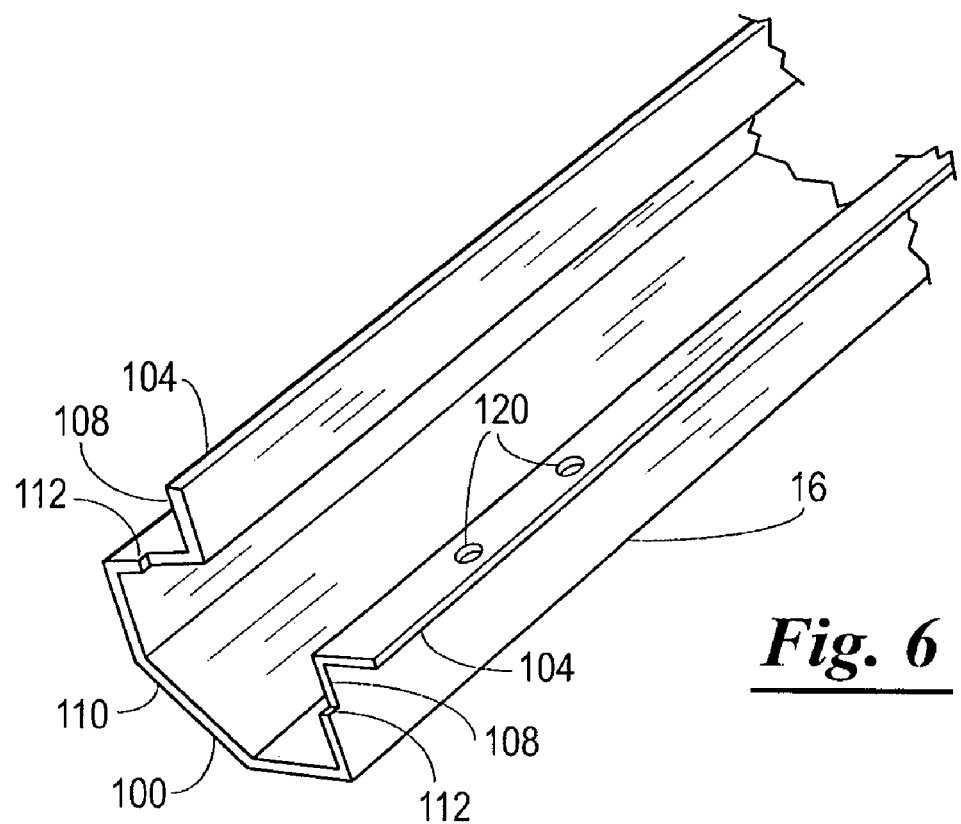
FIG. 6 is a perspective view of a post constructed in accordance with the present invention.
Figure 7:
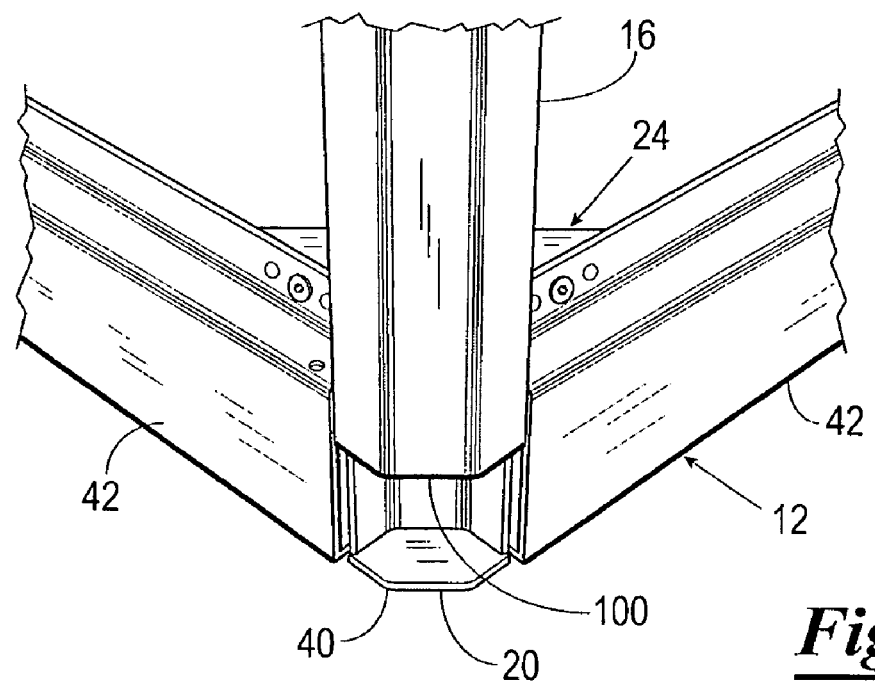
FIGS. 7–9 illustrate the connection of the post to the frame using the connector assembly.
Figure 8:
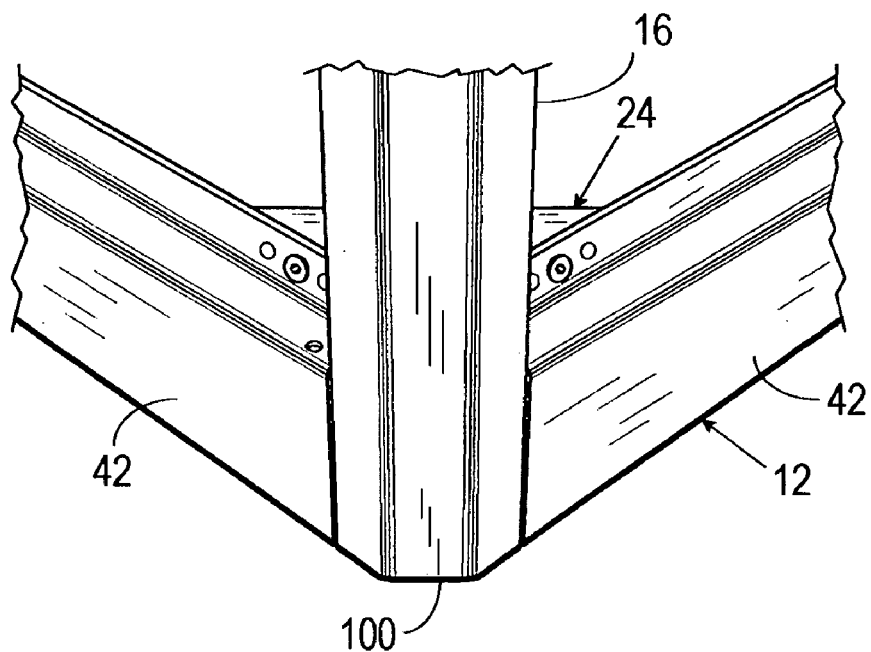

As shown in FIGS. 2, 3 and 6, the corner gusset plates 24 each include a vertical sidewall 50. At least one of the frame 12 and the corner gusset plate 24 have one or more holes 54 formed in the vertical sidewalls 42 and 50, and the other one of the frame 12 and the corner gusset plate 24 includes a semi-shear 58 positioned in the hole 54.

In the example shown in FIG. 4, three holes 54 are formed in the vertical sidewall 42 of the frame 12. In this example, the frame 12 is provided with a first end 62, an opposed second end 64, a first side 66, an opposed second side 68, and four vertical sidewalls 42. Two of the vertical sidewalls 42 extend generally between the first end 62 and the second end 64. The other two vertical sidewalls 42 extend generally between the first side 66 and the second side 68. Each vertical sidewall 42 has six holes 54 with three of the holes 54 in each vertical sidewall 42 being located adjacent to one of the corners 20. As shown in FIG. 6, each corner gusset plate 24 has four semi-shears 58 connected to the vertical sidewall 50. The four semi-shears 58 of each corner gusset plate 24 are disposed in four of the six holes 54 located adjacent to each corner 20. The other two holes 54 adjacent to each corner 20 receive a connecting device 70, such as a bolt, washer and nut, for connecting the vertical sidewalls 42 and 50 together. The semi-shear 58 functions to ensure the accurate placement or alignment of the corner gusset plate 24 in the corner positions. By ensuring accurate alignment of the corner gusset plate 24 in the top/bottom frame 12, the alignment of the corner posts 16 are guaranteed a precision fit.

The corner gusset plate 24 is connected to the frame 12 by any suitable assembly such as glue, screws, magnets, or the like. For example, in the embodiment shown in FIG. 2, the corner gusset plate 24 is provided with a horizontal plate 80. The horizontal plate 80 is rigidly connected to the horizontal wall 40 of the frame 12 via any suitable assembly 81, such as a bolt.

The vertical sidewall 50 of the corner gusset plate 24 can be characterized as having at least two wall portions 86 and 88. The two wall portions 86 and 88 are disposed angularly with respect to each other such that the two wall portions 86 and 88 generally align with the vertical sidewall 42 of the frame 12. When the frame 12 is a rectangular frame, the wall portions 86 and 88 are disposed about 90° with respect to each other. In other words, the vertical sidewalls 42 and 50 of the frame 12 and the corner gusset plate 24 can be characterized as "mutually orthogonal vertical sidewalls."

To connect the wall portions 86 and 88 together, the vertical sidewall 50 is provided with a third wall portion 90 positioned in between the wall portions 86 and 88. Preferably, the vertical sidewall 50 is formed of sheet metal which has been bent to form the wall portions 86, 88 and 90. In the preferred embodiment shown in FIG. 3, the corner clamp plate 26 is supported by the wall portion 90 of the corner gusset plate 24.

As shown in FIGS. 6–9, the post 16 includes a first end 100, an opposed second end 102, and one or more flanges 104 extending at least partly therebetween. The flanges 104 are sized and dimensioned to be inserted into the channel 28 formed between the corner clamp plate 26 and the corner gusset plate 24 to connect the post 16 to the frame 12. The first end 100 and the second end 102 of the post 16 are substantially identical in construction and function. Thus, only the first end 100 will be described hereinafter. The first end 100 of the post 16 includes a pair of recessed portions 108 separated from a medial portion 110 by a pair of shoulders 112. The size of the shoulders 112 can vary widely. However, in one preferred embodiment, the size of the shoulders 112 corresponds to the thickness of the horizontal wall 40 of the frame 12 such that the recessed portions 108 engage the horizontal wall 40 when the post 12 is positioned in an installed position (FIGS. 8 and 9) at the corner 20 of the frame 12. The post 16 can be provided with any suitable assembly for connecting the optional accessories discussed above to the post 16. For example, the post 16 can be provided with a series of holes 120 so that certain of the optional accessories can be bolted directly to the post 16.

To construct the cabinet 10, the four corner gusset plates 24 are connected to the top frame 12a, and four corner gusset plates 24 are connected to the base frame 12b as described above. One of the corner clamp plates 26 is connected to each of the corner gusset plates 24 such that the corner clamp plates 26 are positioned a distance away from the corner gusset plate 24 and the channel 28 is formed between at least a portion of the corner gusset plate 24 and the corner clamp plate 26. At least a portion of each post 16 is positioned in the channel 28 and the corner clamp plate 26 is moved relative to the corner gusset plate 24 to clamp the post 16 between the corner clamp plate 26 and the corner gusset plate 24. For example; the corner clamp plate 26 can be moved by tightening a screw. This procedure is then repeated seven more times to connect each of the four posts 16 to the top frame 12a and the base frame 12b.

The frames 12a and 12b, the post 16, the corner gusset plate 24 and the corner clamp plate 26 are constructed of rigid materials, such as plastic, metal or polymeric materials. In one preferred embodiment, the frames 12a and 12b, the post 16, the corner gusset plate 24 and the corner clamp plate 26 are constructed of sheet metal manufactured using hard press tooling. For example, the frame 12 can be constructed of 1.5 mm sheet steel, the post 16 can be constructed of 1.5 mm sheet steel, the corner gusset plate 24 can be constructed of 3.0 mm sheet steel, and the corner clamp plate 26 can be constructed of 3.0 mm sheet steel.

The connector assembly 18 (or "corner assembly") provides a stable construction that reliably provides a precise fit. Because of how the parts are configured for the corners 20 of the rack frame 12, there is no tolerance buildup.

An added advantage of this configuration is that it can be shipped unassembled and easily assembled on site where the electronic components are to be installed. When shipped unassembled, the rack frame 12 and any accessory components are amenable to being shipped as a so-called "flat pack" that greatly reduces bulk and thus, shipping costs. The design allows the sub-assembly of the top frame 12a (to include top plate and fan plate), bottom frame 12b (to include bottom plate and adjustable feet), and the side frames (to include side panels, depth members, mounting verticals and cable trays), to further enhance the flat-packability by offering reduced assembly time by the final user.

Further, in one preferred embodiment, the cabinet 10 is delivered to a customer with the corner assemblies 18 connected to the top frame 12a and the base frame 12b. Thus, the customer simply needs to slide the posts 16 into place and tighten the mechanism, such as a screw, controlling the distance between the corner clamp plate 26 and the corner gusset plate 24 to assemble the cabinet 10.

The reliable precision fit aspect of the described embodiment means that unassembled shipping and on-site assembly can be carried out without any sacrifice of structural integrity or quality of the finally assembled rack frame product.

While presently preferred embodiments of the present invention have been described herein, one skilled in the art will recognize that many changes or alterations can be made to the preferred embodiments without departing from the spirit and scope of the present invention. It is therefore intended that all such modifications, alterations and other changes be encompassed by the claims.

What is claimed is:

1. A cabinet, comprising:
   a frame having at least a first frame member and a second frame member, the first and second frame members formed as a single piece and defining a corner;
   a post positioned in the corner such that the post is substantially perpendicular to the first and second frame members, the post having a first end and a second end, at least a portion of the post having a channel-shaped wall section terminating with a pair of flanges spaced apart from one another so as to define a lengthwise opening between the flanges, the lengthwise opening extending from at least one of the first end and second end of the post, the lengthwise opening extending toward the other of the first end and second end of the post; and a connector assembly connecting the post to the frame and extending through the lengthwise opening of the post, the connector assembly comprising:

a gusset fixed to the frame; and a clamp plate connected to the gusset and spaced a distance therefrom to form a channel between at least a portion of the gusset and the clamp plate, the flanges of the post positioned within the channel and clamped between the gusset and the clamp plate, wherein the frame includes a horizontal wall with a plane oriented substantially perpendicular to the longitudinal axis of the post and one or more slots formed in the horizontal wall, and wherein the gusset includes at least one tab positioned within one of the slots formed in the frame, and wherein the lengthwise opening of the post allows the post to be assembled to the frame by sliding the flanges of the post into the channel formed by the gusset and the clamp plate with the clamp plate connected to the gusset.

2. The cabinet of claim 1, wherein the frame includes a vertical sidewall and a contiguous horizontal wall and wherein the gusset includes a vertical sidewall in contact with the vertical sidewall of the frame and a horizontal wall in contact with the horizontal wall of the frame, at least one of the frame and the gusset having a hole formed in the vertical sidewall, and the other one of the frame and the gusset having a semi-shear positioned in the hole.

3. The cabinet of claim 2, wherein the frame has the hole and the gusset has the semi-shear.

4. The cabinet of claim 1, wherein the frame defines a corner cutout, and wherein the post is positioned within at least a portion of the corner cutout.

5. A cabinet, comprising:

a frame having at least a first frame member and a second frame member, the first and second frame members formed as a single piece and defining a corner;

a post extending from the frame such that the post is substantially perpendicular to the first and second frame members, the post having a first end, a second end, and a channel shaped wall portion, the wall portion terminating with a pair of flanges spaced apart from one another so as to define a lengthwise opening between the flanges, the lengthwise opening extending from the first end to the second end of the post; and a connector assembly connecting the post to the frame and extending through the lengthwise opening of the post, the connector assembly comprising:

a gusset fixed to the frame; and a clamp plate connected to the gusset and spaced a distance therefrom to form a channel between at least a portion of the gusset and the clamp plate, the flanges of the post positioned within the channel and clamped between the gusset and the clamp plate, wherein the frame includes a horizontal wall with a plane oriented substantially perpendicular to the longitudinal axis of the post and one or more slots formed in the horizontal wall, and wherein the gusset includes at least one tab positioned within one of the slots formed in the frame, and wherein the lengthwise opening of the post allows the post to be assembled to the frame by sliding the flanges of the post into the channel formed by the gusset and the clamp plate with the clamp plate connected to the gusset.

6. The cabinet of claim 5, wherein the frame includes a vertical sidewall and a contiguous horizontal wall and wherein the gusset includes a vertical sidewall in contact with the vertical sidewall of the frame and a horizontal wall in contact with the horizontal wall of the frame, at least one of the frame and the gusset having a hole formed in the vertical sidewall, and the other one of the frame and the gusset having a semi-shear positioned in the hole.

7. The cabinet of claim 6, wherein the frame has the hole and the gusset has the semi-shear.

8. The cabinet of claim 5, wherein the frame defines a corner cutout, and wherein the post is positioned within at least a portion of the corner cutout.

* * * * *